US010957969B2

(12) United States Patent
Pandya et al.

(10) Patent No.: US 10,957,969 B2
(45) Date of Patent: Mar. 23, 2021

(54) INTEGRATED ANTENNAS FOR PORTABLE ELECTRONIC DEVICES

(71) Applicant: Apple Inc., Cupertino, CA (US)

(72) Inventors: Sameer Pandya, Sunnyvale, CA (US); Mario Martinis, Cupertino, CA (US); Baris Ozgen, Mountain View, CA (US); Tyler S. Bushnell, Mountain View, CA (US); Sherry Tang, Cupertino, CA (US); Henry H. Yang, San Jose, CA (US); Christopher M. Werner, San Jose, CA (US); Jayesh Nath, Milpitas, CA (US); Carlo Di Nallo, Belmont, CA (US); Andrea Ruaro, Campbell, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 15/874,805

(22) Filed: Jan. 18, 2018

(65) Prior Publication Data
US 2019/0081387 A1 Mar. 14, 2019

Related U.S. Application Data

(60) Provisional application No. 62/557,054, filed on Sep. 11, 2017.

(51) Int. Cl.
*H01Q 1/27* (2006.01)
*H01Q 1/24* (2006.01)
(Continued)

(52) U.S. Cl.
CPC ............ *H01Q 1/243* (2013.01); *G04R 60/12* (2013.01); *H01Q 1/273* (2013.01); *H04L 69/18* (2013.01); *H04M 1/0266* (2013.01); *H01Q 1/38* (2013.01)

(58) Field of Classification Search
CPC .......... G04R 60/12; H01Q 1/273; H01Q 1/24; H01Q 1/241; H01Q 1/242; H01Q 1/243
See application file for complete search history.

(56) References Cited

U.S. PATENT DOCUMENTS

| 10,181,640 B2 | 1/2019 | Ehman et al. |
| 2011/0006953 A1* | 1/2011 | Chiang ................. G06F 1/1616 343/702 |

(Continued)

FOREIGN PATENT DOCUMENTS

| AU | 2015101837 B4 | 7/2016 |
| CN | 202009084 U | 10/2011 |

(Continued)

OTHER PUBLICATIONS

European Search Report from European Patent Application No. 18191231.2, dated Jan. 28, 2019, 4 pages.
(Continued)

*Primary Examiner* — Daniel Munoz
(74) *Attorney, Agent, or Firm* — Morgan, Lewis & Bockius LLP

(57) ABSTRACT

Aspects of the subject technology relate to electronic devices with antennas. The antenna may be a display-integrated antenna. An antenna feed for the antenna may be located in a recess in a sidewall of a housing of the device. The antenna feed may be coupled to transceiver circuitry on a logic board of the device by a pair of flex circuits. A first one of the pair of flex circuits may form a portion of an antenna feed assembly. A second one of the pair of flex circuits may be an impedance-matching flex having an end that is soldered to the main logic board. The antenna may be coupled to a conductive portion of the housing of the device.

24 Claims, 9 Drawing Sheets

(51) Int. Cl.
*G04R 60/12* (2013.01)
*H04L 29/06* (2006.01)
*H04M 1/02* (2006.01)
*H01Q 1/38* (2006.01)

(56) References Cited

U.S. PATENT DOCUMENTS

| | | | |
|---|---|---|---|
| 2011/0012796 A1* | 1/2011 | Kim | H01Q 1/273 343/702 |
| 2015/0311960 A1 | 10/2015 | Samardzija et al. | |
| 2016/0056526 A1 | 2/2016 | Sannomiya et al. | |
| 2019/0074586 A1 | 3/2019 | Ruaro et al. | |

FOREIGN PATENT DOCUMENTS

| | | |
|---|---|---|
| CN | 203720722 U | 7/2014 |
| CN | 205016725 U | 2/2016 |
| JP | 3205273 U | 7/2016 |
| KR | 10-1622606 B | 5/2016 |
| KR | 2017-0020138 | 2/2017 |
| WO | WO 2015/164010 | 10/2015 |

OTHER PUBLICATIONS

European Office Action from European Patent Application No. 18191231.2, dated Feb. 11, 2019, 8 pages.
Japanese Office Action from Japanese Patent Application No. 2018-132523, dated Jul. 16, 2019, 6 pages including English language translation.
Korean Office Action from Korean Patent Application No. 10-2018-0095026, dated Oct. 18, 2019, 15 pages including English language translation.
Korean Office Action from Korean Patent Application No. 10-2018-0095026, dated Apr. 21, 2020 10 pages including English language translation.
Chinese Office Action from Chinese Patent Application No. 201810925476.4, dated Apr. 23, 2020, 33 pages including English language translation.
European Office Action from European Patent Application No. 18191231.2, dated Feb. 12, 2020, 8 pages.

* cited by examiner

INTEGRATED ANTENNAS FOR PORTABLE ELECTRONIC DEVICES

CROSS-REFERENCE TO RELATED APPLICATIONS

The present application claims the benefit of U.S. Provisional Patent Application Ser. No. 62/557,054, entitled "INTEGRATED ANTENNAS FOR PORTABLE ELECTRONIC DEVICES" filed on Sep. 11, 2017, which is hereby incorporated by reference in its entirety for all purposes.

TECHNICAL FIELD

The present description relates generally to portable electronic devices, and more particularly, but not exclusively, to portable electronic devices with antennas.

BACKGROUND

Electronic devices are often provided with antennas. However, challenges can arise when attempting to integrate one or more antennas into a compact portable electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
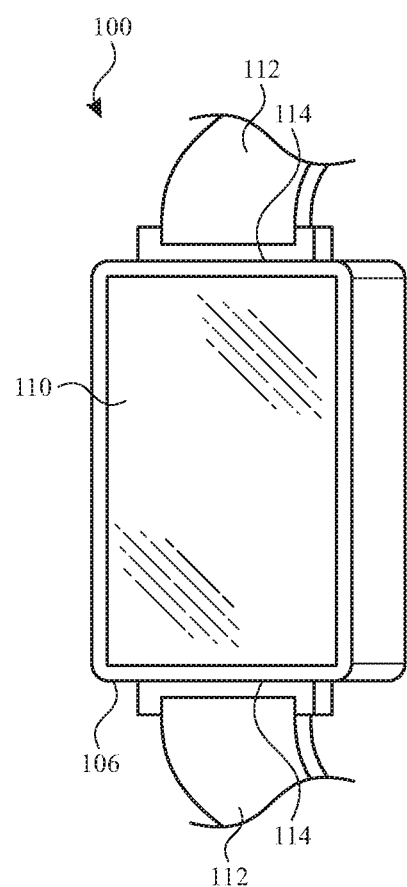
FIG. 1 illustrates a perspective view of an electronic device implemented as a smart watch having an antenna in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, and tablet computers are provided that include a display and an antenna having one or more antenna elements that emit and/or receive electromagnetic signals. Particularly for compact devices such as smart watches, it can be challenging to house both a display and one or more antennas in a configuration in which the antennas efficiently emit and receive electromagnetic signals, and in which the display and the antenna(s) do not interfere with each other.

In order to address some of these challenges with the integration of a display and an antenna in a compact device, in accordance with some aspects of the subject disclosure, a display-integrated antenna is provided with an antenna element for the antenna that is integrated with the display.

An antenna element can be an antenna receiving element that receives electromagnetic signals from an external source, an antenna emitting element that emits electromagnetic signals to be received by an external source, or an antenna emitting and receiving element that both emits and receives electromagnetic signals. In any of these examples, the antenna element can sometimes be referred to herein as an antenna emitting/receiving element. The antenna element may be a resonant antenna element or a non-resonant antenna element. The display-integrated antenna may be a patch antenna such as a cavity-backed patch antenna, a slot antenna, an inverted-F antenna such as a planar inverted-F antenna, a helical antenna, a monopole antenna, a dipole antenna, hybrids of these designs, etc.

Various challenges can also arise when attempting to integrate a display-integrated antenna into a compact device housing. For example, challenges related to antenna bandwidth effects caused by the device housing and other components mounted therein, challenges related to impedance matching for antenna supply circuitry for the antenna, and challenges related to grounding of antenna elements can arise.

In accordance with various aspects of the subject disclosure, various features of the housing, and the arrangement of antenna circuitry with respect to the housing, are described herein that may address the challenges related to antenna bandwidth effects of the device housing.

In accordance with various aspects of the subject disclosure, various features of antenna feed structures for the antenna are described herein that may address the challenges related to impedance matching for antenna supply circuitry for the antenna.

In accordance with various aspects of the subject disclosure, various features of grounding structures for the antenna are described herein that may address the challenges related to grounding of antenna elements for a display-integrated antenna.

As described in further detail hereinafter, the combination of the disclosed features of the housing, the arrangement of the antenna circuitry with respect to the housing, the feed structures for the antenna, and the grounding structures for the antenna allow a single antenna, integrated with electronic device display structures, to function to provide many or all of the standard communications protocols consumers expect in a modern device (e.g., global positioning system (GPS) communications, WiFi® communications, and near-field communications such as Bluetooth® communications).

FIG. 1 is a perspective view of electronic device 100 in a configuration in which electronic device 100 has been implemented in the form of a wearable device such as a smart watch having a display-integrated antenna. As shown, in a smart watch implementation, strap 112 may be coupled to housing 106 at interfaces 114 and arranged to secure device 100 to a part of a user's body such as around the user's wrist. Smart watch 100 may have a housing 106 that is formed from a monolithic conductive structure or may be formed from two or more conductive and/or non-conductive parts. However, it should be appreciated that electronic device 100 may be implemented in other configurations such as in the form of a smart phone, a tablet computer, a laptop computer, or other mobile or portable electronic device.

Figure 2:
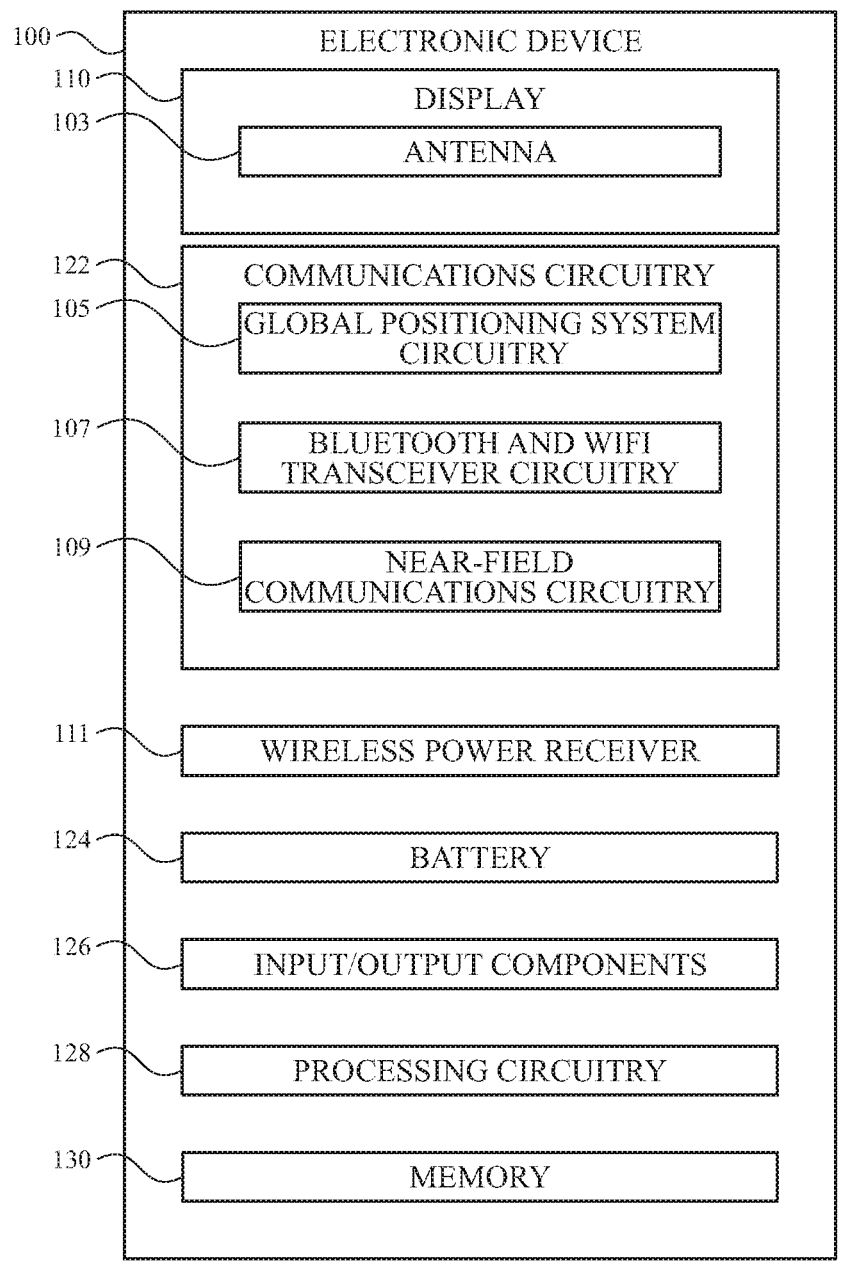
FIG. 2 illustrates a schematic block diagram of an electronic device having an antenna in accordance with various aspects of the subject technology.

A schematic block diagram of an illustrative electronic device with a display-integrated antenna is shown in FIG. 2. In the example of FIG. 2, device 100 includes display 110 with an integrated antenna 103. Communications circuitry 122 may be coupled to antenna 103 in the display to send and received the desired signals using the display-integrated antenna.

Device 100 also includes processing circuitry 128 and memory 130. Memory 130 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry 128. Processing circuitry 128 may be used in controlling the operation of device 100. Processing circuitry 128 may sometimes be referred to as system circuitry or a system-on-chip (SOC) for device 100.

Processing circuitry 128 may include a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 128 may be used to run software for device 100, such as communications applications, internet browsing applications, email applications, media playback applications, operating system functions, software for capturing and processing images, software implementing functions associated with gathering and processing sensor data, and/or software that controls audio, visual, and/or haptic functions.

Device 100 may also include battery 124 and input/output components 126. Input/output components 126 may include a touch-sensitive layer of display 110, a keyboard, a touchpad, and/or one or more real or virtual buttons. Input/output components 126 may also include audio components such as one or more speakers and/or one or more microphones.

To support interactions with external equipment, processing circuitry 128 may be used in implementing communications protocols. Communications protocols that may be implemented using processing circuitry 128 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Communications circuitry 122 includes radio-frequency (RF) transceiver circuitry formed from one or more integrated circuits, power amplifier circuitry, low-noise input amplifiers, and/or passive RF components coupled to one or more antennas such as antenna 103, transmission lines, and other circuitry for handling RF wireless signals. Wireless signals can also be sent using infrared communications.

As shown in FIG. 2, communications circuitry 122 includes radio-frequency transceiver circuitry such as global positioning system (GPS) circuitry 105, Bluetooth® and WiFi® transceiver circuitry 107, and near-field communications circuitry 109 for handling communications with antenna 102 in various radio-frequency communications bands. For example, transceiver circuitry 107 may be wireless local area network transceiver circuitry that can handle communications in 2.4 GHz and 5 GHz bands for WiFi® (IEEE 802.11) communications and that can handle communications in the 2.4 GHz Bluetooth® communications band.

Communications circuitry 122 may include 60 GHz transceiver circuitry, circuitry for receiving television and radio signals, paging system transceivers, near field communications (NFC) communications circuitry 109 (e.g., an NFC transceiver operating at 13.56 MHz or other suitable frequency), etc. Communications circuitry 122 includes satellite navigation system circuitry such as global positioning system (GPS) circuitry 105 for receiving GPS signals at 1575 MHz or for handling other satellite positioning data.

Although not explicitly shown, communications circuitry 122 may include cellular telephone transceiver circuitry for handling wireless communications in frequency ranges such as a low communications band from 700 to 960 MHz, a mid-band from 1400 MHz or 1500 MHz to 2170 MHz (e.g., a mid-band with a peak at 1700 MHz), and a high band from 2170 or 2300 to 2700 MHz (e.g., a high band with a peak at 2400 MHz) or other communications bands between 700 MHz and 2700 MHz or other suitable frequencies (as examples). Communications circuitry 122 may handle voice data and non-voice data. Communications circuitry 122 can include circuitry for other short-range and long-range wireless links if desired. In WiFi® and Bluetooth® links and other short-range wireless links, wireless signals are typically used to convey data over tens or hundreds of feet. In cellular telephone links and other long-range links, wireless signals are typically used to convey data over thousands of feet or miles. Display integrated antenna 103 may be operated by transceiver circuitry 105 and 107 to send and/or receive communications in GPS, WiFi, and Bluetooth® bands.

Electronic device 100 may include wireless power receiver 111 for receiving wirelessly transmitted power from a wireless power adapter. Electronic device 100 may be implemented in the form of a cellular telephone, a laptop computer, a tablet computer, a somewhat smaller portable device such as a wrist-watch device, pendant device, or other wearable or miniature device, a media player, a gaming device, a navigation device, a fitness device, or other electronic equipment.

Figure 3:
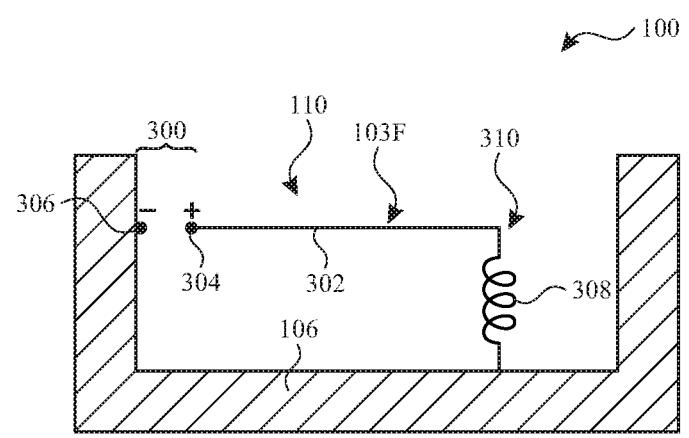
FIG. 3 illustrates a schematic diagram of an illustrative monopole antenna in accordance with various aspects of the subject technology.

FIG. 3 is a simplified cross-sectional side view of device 100 showing how a display-integrated antenna such as antenna 103 in display 110 for device 100 may be formed within a cavity formed from housing 106. Antenna 103F of FIG. 3 has an antenna element such as element 302 (sometimes referred to as an antenna emitting/receiving element) coupled to an antenna feed such as feed 300. Feed 300 may have a positive antenna feed terminal such as positive antenna feed terminal 304 and a ground antenna feed terminal such as ground antenna feed terminal 306. Positive antenna feed terminal 304 is coupled to antenna emitting/receiving element 302. Ground antenna feed terminal 306 is coupled to ground (e.g., to metal sidewall portions of housing 106 and other conductive structures around element 302 such as printed circuit structures to form an antenna cavity in the example of FIG. 3). Feed 300 may be coupled to transceiver circuitry (e.g., GPS circuitry 105 and Bluetooth® and WiFi® transceiver circuitry 107) by a transmission line. As described in further detail hereinafter, the transmission line may include one or more coaxial cables and/or one or more flexible printed circuits that form the transmission line. Antenna element 302 may be a monopole antenna element (e.g., antenna 103F may be a cavity-backed monopole antenna) or other suitable antenna element such as an antenna resonating element. Feed 300 may convey communications signals for three different communications protocols to the antenna element of display 110. For example, the three different communications protocols may be a global positioning system protocol, a WiFi protocol, and a Bluetooth protocol (e.g., covering a range of frequencies and/or frequency bands between 1.5 GHz to 2.5 GHz).

As shown in the illustrative configuration of FIG. 3, a portion of antenna element 302 such as end 310 of antenna element 302 may be coupled to ground (e.g., housing 106) by inductive path 308 (e.g., a path formed from metal traces on a flexible printed circuit or other suitable signal path as described in further detail hereinafter). Antenna 103F may be used to transmit and receive radiofrequency signals in GPS, WiFi, and Bluetooth® bands and other bands (e.g., bands above 700 MHz, bands above 960 MHz, etc.) or other suitable frequency bands. Additional antennas may also be provided in device 100 to handle these frequency bands and/or other frequency bands. The configuration for antenna 103F of FIG. 3 is merely illustrative.

Figure 4:
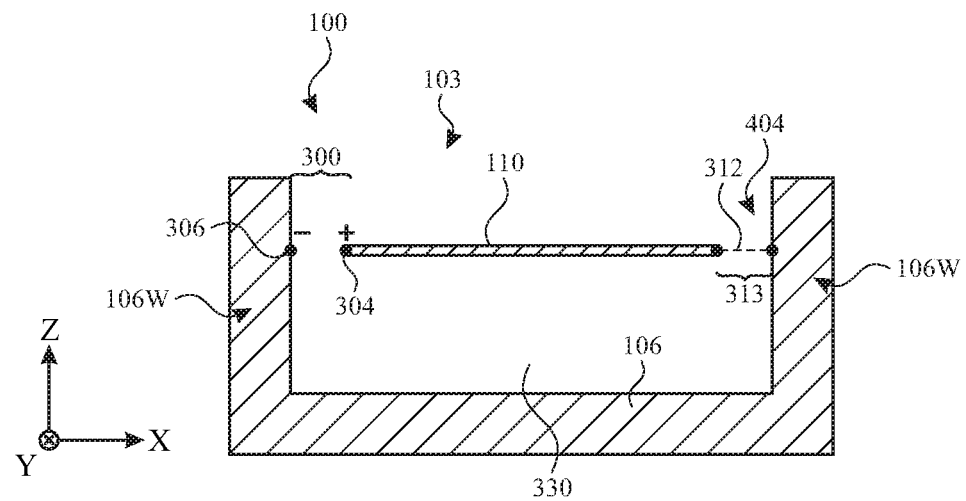
FIG. 4 illustrates a schematic diagram of an illustrative slot antenna in accordance with various aspects of the subject technology.

For example, FIG. 4 is a simplified cross-sectional side view of device 100 showing how display-integrated antenna 103 of display 110 may be formed as a slot antenna in cooperation with housing 106. As shown in FIG. 4, antenna 103 may include conductive structures of display 110 coupled to an antenna feed such as feed 300. As with the patch antenna configuration of FIG. 3, feed 300 may have a positive antenna feed terminal such as positive antenna feed terminal 304 and a ground antenna feed terminal such as ground antenna feed terminal 306. Positive antenna feed terminal 304 may be coupled to conductive display structures of display 110. Ground antenna feed terminal 304 may be coupled to ground (e.g., to metal sidewalls 106W of housing 106 and other conductive structures around display 110 such as printed circuit structures). Housing 106 and conductive display structures of display 110 may define an interior cavity or volume 330. Additional device components may be mounted within volume 330 if desired. Feed 300 may be coupled to transceiver circuitry (e.g., GPS circuitry 105 and Bluetooth® and WiFi® transceiver circuitry 107) by a transmission line. As described in further detail hereinafter, the transmission line may include one or more coaxial cables and/or one or more flexible printed circuits that form the transmission line.

Conductive emitting and/or receiving structures of display 110 may be coupled to ground (e.g., housing wall 106W) by interconnect path 312 (e.g., across gap 313 at the side of display 110 opposing feed 300). Interconnect path 312 may include conductive structures that are directly connected to display 110, may include conductive structures that are capacitively coupled to (but not in contact with) display 110 (e.g., while still spanning gap 313 and electrically shorting display 110 to housing 106), and/or may include conductive structures that are not coupled to display structures 110. In the example of FIG. 4, housing 106 (e.g., a conductive or non-conductive housing such as a ceramic housing with a conductive sputter) defines a rear wall of device 100 that opposes display 110 (e.g., volume 330 may be partially defined by a rear wall of device 100). This is merely illustrative. If desired, some or all of the rear wall of device 100 may be formed from dielectric materials and volume 330.

Figure 5:
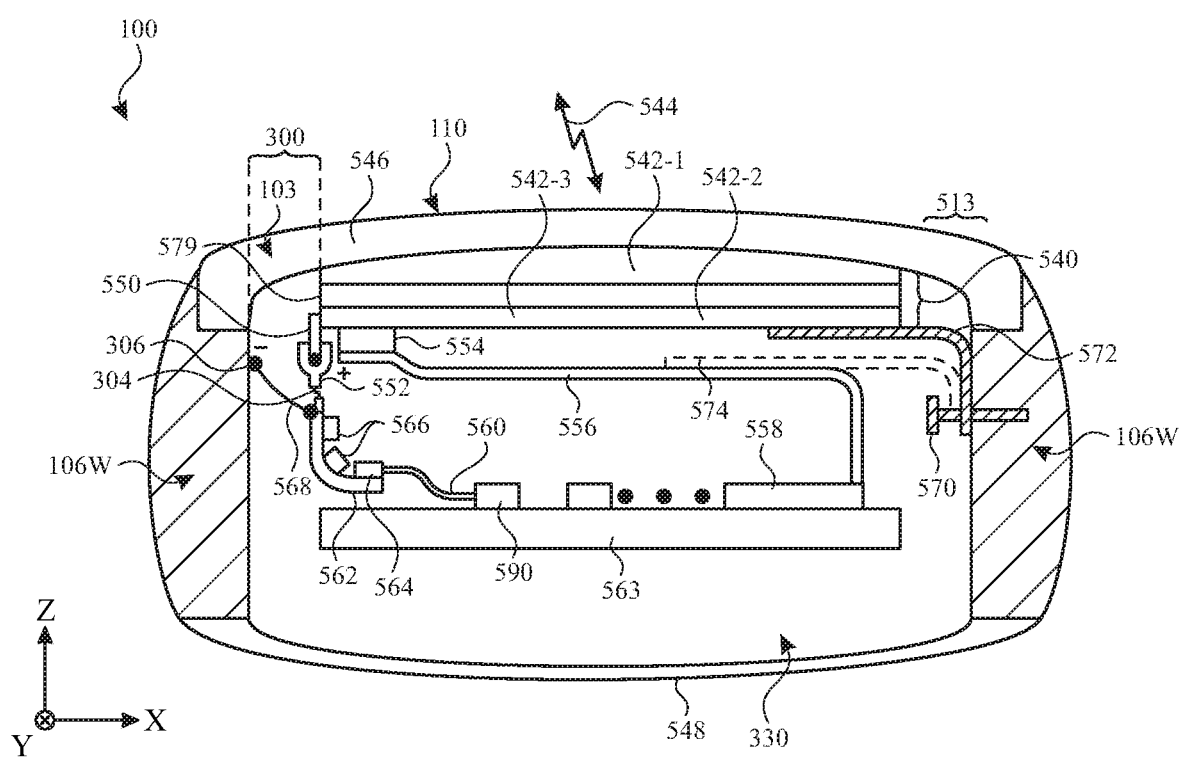
FIG. 5 illustrates a cross-sectional side view of an illustrative electronic device having an antenna of the type shown in FIGS. 4 and 5 in accordance with various aspects of the subject technology.

FIG. 5 is a cross-sectional side view of device 100 showing how conductive paths 308 and/or 312 may be implemented within antenna 103 (e.g., as in the configurations of antenna 103 in FIG. 3 or 4). As shown in FIG. 5, device 100 may have (e.g., conductive) housing sidewalls 106W that extend from the rear face to the front face of device 100. Housing 106 may include a rear housing wall such as housing wall 548 that may be formed from conductive and/or dielectric materials. Display 110 may be formed at the front face of device 100 whereas rear housing wall 3148 is formed at the rear face of device 100. Sidewalls 106W may be metal housing sidewalls 106W that may be coupled to ground feed terminal 306 of antenna 103. In other examples, sidewalls may be non-conductive (e.g., ceramic) sidewalls on which conductive antenna feeds and returns are mounted. Display 110 may include a display cover layer 546 and a display module 540 under cover layer 546.

Display module 540 of display 110 may include conductive components that are used in forming conductive structures of antenna 103 (see, e.g., FIGS. 3 and 4). The conductive components in display module 540 may, for example, have planar shapes (e.g., planar rectangular shapes, planar circular shapes, etc.) and may be formed from metal and/or other conductive material that carries antenna currents. The thin planar shapes of these components and the stacked configuration of FIG. 5 may, for example, capacitively couple these components to each other so that they may operate together at radio frequencies to form an antenna element of display 110 of FIGS. 3 and 4 (e.g., to effectively/electrically form a single conductor).

The components that form the antenna element of display 110 may include, for example, planar components on one or more layers 542 (e.g., a first layer 542-1 such as a touch layer, a second layer 542-2 such as a display panel layer, a third layer 542-3 such as a communications layer or antenna layer, or other desired layers). As one example, touch layer 542-1 may form a touch sensor for display 110, display panel layer 542-2 may form a display panel (sometimes referred to as a display, display layer, or pixel array) for display 110, and communications layer 542-3 may form a GPS, WiFi, Bluetooth, and/or other near-field communications antenna for device 100 and/or other circuitry for supporting GPS, WiFi, Bluetooth, and/or other near-field communications.

Touch layer 542-1 may be a capacitive touch sensor and may be formed from a polyimide substrate or other flexible polymer layer with transparent capacitive touch sensor electrodes (e.g., indium tin oxide electrodes), for example. Display panel layer 542-2 may be an organic light-emitting diode display layer or other suitable display layer. Communications layer 542-3 may be formed from a flexible layer that includes a magnetic shielding material (e.g., a ferrite layer or other magnetic shielding layer) and that includes loops of metal traces. If desired, a conductive back plate, metal shielding cans or layers, and/or a conductive display frame may be formed under and/or around communications layer 542-3 and may provide structural support and/or a grounding reference for the components of module 540. Module 540 may sometimes be referred to herein as display assembly 540.

Conductive material in touch layer 542-1, display panel layer 542-2, communications layer 542-3, a conductive back plate for display 110, conductive shielding layers, conductive shielding cans, and/or a conductive frame for display 110 may be used in forming an antenna element of display-integrated antenna 103. This and/or other conductive material in display 110 used to form an antenna element of display-integrated antenna 103 may be coupled together using conductive traces, vertical conductive interconnects or other conductive interconnects, and/or via capacitive coupling, for example.

Antenna 103 may be fed using antenna feed 300. Feed 300 may have a positive terminal such as terminal 304 that is coupled to display module 540 and therefore conductive display structures such as communications layer 542-3, display panel layer 542-2, touch layer 542-1, a metal back plate for module 540, and/or a metal display frame for module 540). Feed 300 may have a ground terminal such as terminal 306 that is coupled to an antenna ground in device 100 (e.g., metal housing wall 106W).

As shown in FIG. 5, device 100 may include printed circuit board structures such as printed circuit board 563. Printed circuit board 563 may be a rigid printed circuit board, a flexible printed circuit board, or may include both flexible and rigid printed circuit board structures. Printed circuit board 563 may sometimes be referred to herein as main logic board (MLB) 563. Electrical components such as transceiver circuitry 590 (e.g., an implementation of GPS circuitry 105 and Bluetooth® and WiFi® transceiver circuitry 107), display interface circuitry 558, and other components may be mounted to main logic board 563. Radiofrequency signals may be conveyed by antenna 103 through display cover layer 546, as shown by arrow 544.

Display module 540 may include one or more connectors 554. Connectors 554 may be coupled to one or more printed circuits 556. Printed circuits 556 may include flexible printed circuits (sometimes referred to herein as display flexes 556), rigid printed circuit boards, or traces on other substrates if desired. Connectors 554 may convey signals between layers 542 of display module 540 and display interface circuitry 558 on logic board 563 over display flexes 556.

As an example, display module 540 may include a first connector 554 that conveys GPS, WiFi, and/or Bluetooth® communications signals to and/or from communications layer 542-3 over a first flex circuit 556, a second connector 554 that conveys display data (e.g., image data) from display interface 558 to display panel layer 542-2 over a second flex circuit 556 (e.g., layer 542-2 may emit light corresponding to the display data), and a third connector 554 may convey touch sensor signals from touch layer 542-1 to interface circuitry 558 over a third flex circuit 556. Connectors 554 may include conductive contact pads, conductive pins, conductive springs, conductive adhesive, conductive clips, solder, welds, conductive wires, and/or any other desired conductive interconnect structures and/or fasteners for conveying data associated with display module 540 between display module 540 and circuitry on logic board 563 or elsewhere in device 100.

Radio-frequency transceiver 590 may be coupled to feed 300 of antenna 103 over a radiofrequency transmission line. The radio-frequency transmission line may include conductive paths in flexible printed circuit 560 and structure 562. Structure 562 may, for example, be formed from plastic or other dielectric materials and/or may include a second flexible printed circuit. The conductive paths associated with the radio-frequency transmission line formed by printed circuit 560 may be coupled to the conductive paths associated with structure 562 over radio-frequency connector 564.

Ground conductor 568 may be formed in the transmission line and may be coupled to ground feed terminal 306 over path 568 (e.g., ground traces in substrate 562 may be coupled to terminal 304 over path 568). Path 568 may include a conductive wire, conductive adhesive, conductive fasteners such as screws, conductive pins, conductive clips, conductive brackets, solder, welds, and/or any other desired conductive interconnect structures. Signal conductor 566 of the transmission line may be coupled to feed terminal 306 of antenna 103 over conductive clip 552 (e.g., signal traces in substrate 562 may be coupled to terminal 306 over conductive clip 552).

If desired, a conductive tab or blade such as conductive tab 550 may be coupled to the conductive structures of display module 540 (e.g., conductive structures in layers 542, a conductive back plate, a conductive frame, conductive shielding cans or layers, and/or other conductive structures in module 540). Clip 552 may mate with tab 550 to form an electrical connection between the transmission line and feed terminal 304 (e.g., feed terminal 304 may be located on tab 550 when clip 552 is attached to tab 550). Clip 552 may, for example, be a tulip clip or other clip that has prongs or other structures that exerts pressure towards tab 550, thereby ensuring that a robust and reliable electrical connection is held between tab 550 and clip 552 over time.

When configured in this way, antenna currents may be conveyed over feed 300 and may begin to flow (e.g., in the X-Y plane of FIG. 5). Conductive interconnect paths such as paths 308 and/or 312 may span gap 513 (e.g., an implementation of gap 313 or a gap associated with a patch antenna or other type of antenna) between a given side of module 540 and an adjacent sidewall 106W. In the example of FIG. 5, conductive interconnect paths such as paths 308 and/or 312 are implemented using conductive interconnect structures 572 and/or conductive interconnect structures 574.

As shown in FIG. 5, conductive interconnect structure 572 may be shorted to (e.g., in direct contact with) the conductive material in module 540 (e.g., conductive material within touch layer 542-1, display panel layer 542-2, or communications layer 542-3, a conductive frame of module 540, a conductive back plate of module 540, shielding structures in module 540, and/or other conductive material in module 540 that are used to form the antenna emitting/receiving element of antenna 103). For example, conductive adhesive or conductive fastening structures such as pins, springs, screws, clips, brackets, and/or other fastening structures may be used to ensure that interconnect 572 is held in contact with conductive material in display module 540. Interconnect 572 may extend across gap 513 and may be shorted to housing wall 106W. Interconnect 572 may be held into contact with housing wall 106W using conductive adhesive, pins, springs, screws, clips, brackets, and/or other structures if desired. In the example of FIG. 5 a conductive screw 570 fastens interconnect 572 to wall 106W and serves to electrically short interconnect 572 and the antenna emitting/receiving element of antenna 103 to wall 106W.

When configured in this way, conductive interconnect 572 may define a portion of the perimeter of a slot of antenna 103 (e.g., in the X-Y plane of FIG. 5 in a slot antenna configuration for antenna 103). Alternatively, or in addition, interconnect 572 may form a short circuit between conductive material in module 540 and housing sidewall 106W (e.g., antenna currents for antenna 103 may flow over interconnect 572 between module 540 and housing wall 106W). By shorting module 540 to wall 106W across gap 513, any excessively strong electric fields in region 513 may be mitigated, thereby optimizing antenna efficiency relative to scenarios where module 540 is completely isolated from walls 106W.

This example is merely illustrative. Interconnect paths 308 and/or 312 need not directly contact display module 540. In another suitable arrangement, interconnect paths 308 and/or 312 may span gap 513 without directly contacting display module 540 (e.g., as shown by conductive interconnect structures 574). In this scenario, interconnect structures 574 may be (e.g., a flexible conductive tape such as a conductive grounding tape) electrically shorted to one or more display flexes 556 (e.g., to ground conductors or other conductive material in display flexes 556). For example, interconnect structures 574 may be electrically shorted to display flexes 556 using conductive adhesive or conductive fastening structures such as pins, springs, screws, clips, brackets, and/or other structures that ensure that interconnect structures 574 are held in contact with display flexes 556. Interconnect 574 may extend across gap 513 and may be shorted to housing wall 106W using screw 570 or other fastening structures.

If desired, conductive interconnect structures 574 may be located sufficiently close to the conductive material in display module 540 so as to effectively short the antenna emitting/receiving element of display 110 to ground (e.g., at radio-frequencies handled by feed 300). For example, interconnect structures 574 may be capacitively coupled to conductive structures in display module 540 and antenna currents associated with antenna 103 may flow between display module 540 and housing wall 106W over interconnect 574 (e.g., via direct or capacitive coupling). Conductive interconnect structures 574 need not be shorted to display flexes 556 in this scenario, if desired.

In another suitable arrangement, conductive interconnect structures 574 may be located far enough away from display module 540 so that interconnect structures 574 are not capacitively coupled to the conductive material in display module 540. In this scenario, interconnect structure 574 is held at a ground potential (e.g., because interconnect structure 574 shorts ground structures in display flexes 556 to grounded housing wall 106W).

The example of FIG. 5 is merely illustrative. In general, housing sidewalls 106W, cover layer 546, and rear housing wall 548 may have any desired shapes. Additional components may be formed within volume 5130 if desired. A substrate or other support structure may be interposed between logic board 563 and display flexes 556 if desired (e.g., to hold flexes 556 in place). Other arrangements may be used if desired. If desired, flexible printed circuit 560 may be coupled to feed 300 without structure 562 or flexible printed circuit 560 may be omitted (e.g., structure 562 may be coupled directly to transceiver circuitry 590). Other transmission line and feeding structures may be used if desired.

Figure 6:
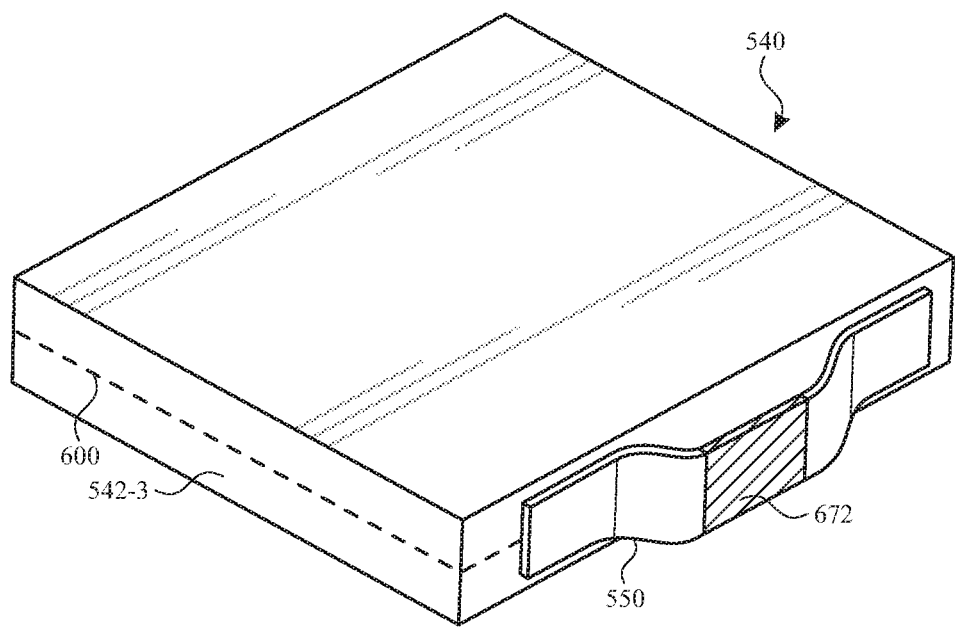
FIG. 6 illustrates is a perspective view of an illustrative conductive tab that may be used in coupling an antenna feed terminal to conductive display structures that are used in an antenna in accordance with various aspects of the subject technology.

Tabs, clips, or other protruding portions of display module 540 such as tab 550 may serve as antenna feed terminal 304. Tab 550 may be formed at edge 579 of display module 540 and may be received between flexible spring fingers such as metal prongs in clip 552. A rear perspective view of module 540 in an illustrative configuration in which tab 550 has been formed from a strip of metal is shown in FIG. 6. As shown in FIG. 6, display module 540 may include conductive structures 600 such as conductive structures in communications layer 542-3, a metal frame for module 540, a metal back plate for module, shielding structures, or other conductive structures. Tab 550 may be coupled to conductive structures 600. For example, tab 550 may be formed from an integral protrusion of conductive structures 600 or may be coupled to structures 600 using conductive adhesive, conductive screws, welds, solder, or other conductive fasteners. If desired, tab 550 may have a coating such as coating 672 (e.g., gold, nickel, or other metals) to facilitate satisfactory ohmic contact between tab 550 and the prongs of clip 552 (see, e.g., FIG. 5) when the coated surface of tab 550 is received between the prongs of clip 552.

Figure 7:
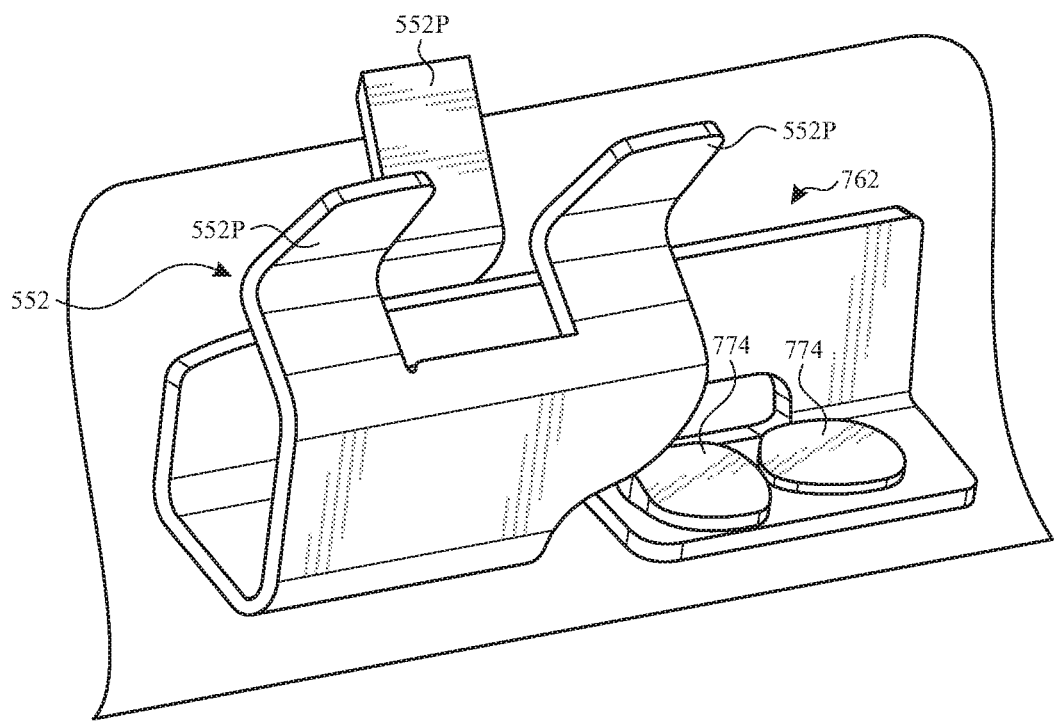
FIG. 7 illustrates a perspective view of an illustrative set of spring fingers that may be used to couple a positive antenna feed terminal to the conductive tab of FIG. 6 in accordance with various aspects of the subject technology.

A perspective view of clip 552 in an illustrative configuration in which clip 552 is secured using fasteners such as screws 774 is shown in FIG. 7. As shown in FIG. 7, clip 552 may be mounted on a plastic support structure 762 or other suitable support structures. Support structure 762 and clip 552 may be mounted in a recess in a sidewall of housing 106, as described in further detail hereinafter. Metal traces on structure 562 may route positive antenna feed signals from a flexible integrated circuit (flex circuit) on the sidewall of housing 106 to clip 552. Clip 552 may include prongs 552P that mechanically hold tab 550 in place and that electrically couple the metal traces on structure 762 to feed terminal 304. If desired, impedance matching circuitry and other circuitry may be mounted on support structure 562 or otherwise coupled to clip 552. For example and as discussed in further detail hereinafter, the impedance matching circuitry can include a second flexible integrated circuit that extends along a portion of the sidewall of housing 106 to MLB 563. The example of FIG. 7 is merely illustrative and, if desired, other conductive fastening mechanisms may be mounted within a recess in the sidewall of housing 106 or elsewhere to secure a transmission line to feed terminal 304.

Figure 8:
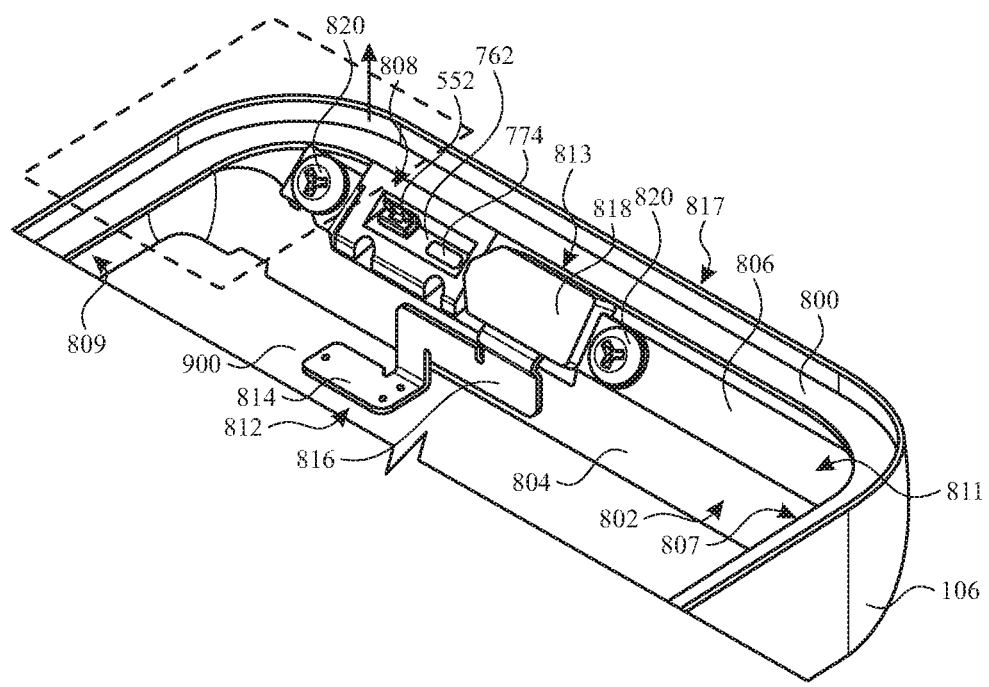
FIG. 8 illustrates a perspective view of the spring fingers of FIG. 7 disposed in a recess in a sidewall of a housing of a portable electronic device in accordance with various aspects of the subject technology.

FIG. 8 is a perspective view of a portion of housing 106 that illustrates how an antenna feed such as clip 552 and support structure 762 can be mounted in a recess 808 in a sidewall 802 of housing 106.

As shown in FIG. 8, housing 106 includes a first sidewall 802 having first and second ends and includes recess 808 located nearer the first end than the second end. A second sidewall 809 extends perpendicularly from the first end of first sidewall 802 (e.g., via a soft-curved corner in the example of FIG. 8). A third sidewall 807 extends perpendicularly from the second end of the first sidewall (e.g., via a soft-curved corner in the example of FIG. 8). As shown in FIG. 8, ledge 800 may be formed on housing 106 and may run along the first, second, and third sidewalls 802, 809, and 807 (and along a fourth sidewall not shown in FIG. 8).

Display 110 having an integrated antenna 103 may have a cover layer that that mates with ledge 800 of housing 106 in an assembled device. Antenna feed 300 (e.g., clip 552) is located within recess 808 in first sidewall 802. As shown in FIG. 8, second sidewall 809, third sidewall 807, and a portion 811 of the first sidewall that extends from recess 808 to third sidewall 807 are free of antenna emitting/receiving elements. In this way, the arrangement of housing 106 and the components attached thereto help contribute to allowing a display-integrated antenna to be used to send and/or receive signals in the GPS, WiFi, and Bluetooth® bands.

As shown in FIG. 8, flexible printed circuit 812 is communicatively coupled to antenna feed 552 and extends along first sidewall 802 from recess 808 into at least part of portion 811 of first sidewall 802 that extends from recess 808 to third sidewall 807. In the example of FIG. 8, sidewall 802 includes a vertical portion 804 that extends perpendicularly from a rear portion of housing 106 toward a front of housing 106 and an angled portion 806 that extends non-perpendicularly from vertical portion 804 in a direction away from the rear portion of housing 106 and toward an outer sidewall surface 817 of sidewall 802.

In the example of FIG. 8, flex circuit 812 extends along angled portion 806 from between support structure 762 in recess 808 toward third sidewall 807. Flex circuit 812 also includes a portion 816 that extends along vertical portion 804 of sidewall 802 and a portion 814 that extends from portion 816. Portion 814 is connected to printed circuit 900 (e.g., an implementation of main logic board 563). Portion 814 may include a surface mount connector, another type of connector, or may be soldered or otherwise electrically connected to printed circuit 900. Radio-frequency transceiver circuitry such as transceiver circuitry 590 (see, e.g., FIG. 5) may be mounted to printed circuit 900 and coupled to antenna feed 552 via flex circuit 812 to transmit and receive antenna signals at frequencies above 960 MHz using the antenna (e.g., GPS signals, WiFi® signals, and Bluetooth® signals). As shown in FIG. 8, ledge 800 is disposed at a front of housing 106 and printed circuit 900 is disposed at a rear of housing 106. Fasteners such as screws 820 may secure a feed assembly 813, including flex circuit 812, feed 552 and support structure 762, and circuitry 818 formed on flex circuit 812, to sidewall 802. Screws 820 may be conductive screws that provide a grounding connection between flex circuit 812 and housing 106 or may mechanically couple feed assembly 813 to sidewall 802 without providing an electrical connection to the sidewall. The arrangement of feed assembly 813 of FIG. 8 is merely illustrative.

Figure 9:
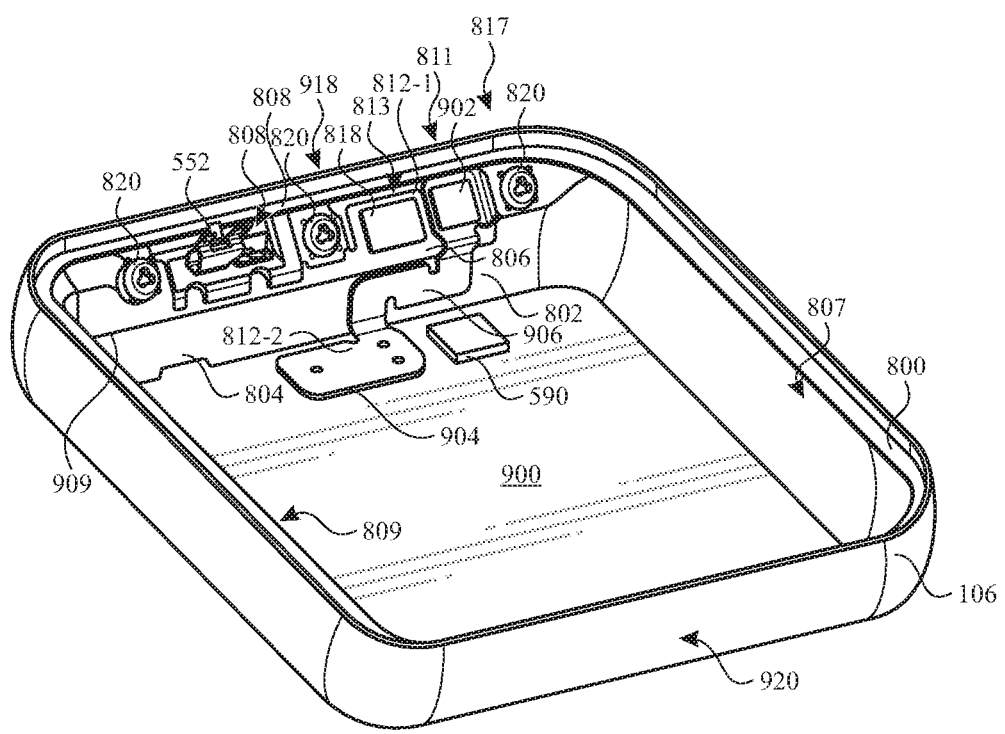
FIG. 9 illustrates a perspective view of communications circuitry disposed on a sidewall of a housing of a portable electronic device in accordance with various aspects of the subject technology.

FIG. 9 shows another arrangement for feed assembly 813. In the example of FIG. 9, flex circuit 812 includes a first flex circuit 812-1 that is a part of feed assembly 813 and a second flex circuit 812-2 that is detachably connected to first flex circuit 812-1 by a connector 902. First flex circuit 812-1 and second flex circuit 812-2 may include respective first and second portions of connector 902 (e.g., an implementation of connector 564 of FIG. 5) that can be mechanically and electrically mated together to couple transceiver circuitry 590 on printed circuit 900 to feed 552. Flex circuits 812-1 and 812-2 may be implementations, respectively, of elements 562 and 560 of FIG. 5, for example).

As shown in FIG. 9, second flex circuit 812-2 extends from a first portion of connector 902 along first sidewall 802 to printed circuit board 900. First flexible printed circuit 812-1 is communicatively coupled to antenna feed 552 and extends along sidewall 802 (e.g., along angled portion 806 of sidewall 802). A first portion of detachable connector 902 is formed on first flexible printed circuit 812-1. Second flexible printed circuit 812-2 has a first end that includes a second portion of detachable connector 902 and an opposing second end 904 that is connected (e.g., soldered) to printed circuit board 900. For example, connector 902 may be a board-to-board connector, a zero-insertion-force connector or other connector having first and second portions respectively formed on first and second flex circuits 812-1 and 812-2. Second flex circuit 812-2 includes mid-portion 906 that extends along sidewall 802 (e.g., along vertical portion 804 of the sidewall) between the first end and the second end of second flex circuit 812-2.

In the example of FIG. 9, first flexible printed circuit 812-1 is disposed on angled portion 806 of first sidewall 802 and mid-portion 906 of second flexible printed circuit 812-2 includes an s-curve portion that is disposed on the vertical portion 804 of the first sidewall. As shown in FIG. 9, the s-curve portion of second flexible printed circuit 812-2 may extend along vertical portion 804 of sidewall in a direction that is parallel to a boundary 909 between the vertical portion and the angled portion.

The arrangement of feed assembly 813 as shown in FIG. 9 may allow impedance matching for antenna feed 552 (e.g., based on the length and shape of the s-curve of second flex circuit 812-2) and may improve the reworkability of device 100 during manufacturing and/or during repairs during the lifetime of the device. For example, in the arrangement of FIG. 9, feed assembly 813 can be replaced by detaching connector 902, replacing feed assembly 813, and recalibrating flex 812-2 and transceiver circuitry 590 with a probe at the portion of connector 902 on second flex circuit 812-2, without removing components disposed between display 110 and MLB 900. Providing a permanent solder connection between second flex circuit 812-2 and MLB 900 also reduces the height of the components within housing, which can help reduce the size of device 100.

Although FIGS. 8 and 9 show a substantially square housing with four straight sidewalls and four rounded corners, it should be appreciated that the antenna and related feed structures disclosed herein can be provided in housings having other shapes. As examples, housing 106 can be provided with three straight sidewalls and three rounded corners in a substantially triangular shape, five or more straight sidewalls with five or more corresponding rounded corners in a pentagonal or other shape with straight sidewalls, any of these shapes with sharp corners or multi-angled corners, or a substantially round (e.g., circular or oval) shape with a continuously curved sidewall without corners.

Although FIGS. 8 and 9 show portion 816 of flexible printed circuit 812 (FIG. 8) and portion 906 of second flexible printed circuit (FIG. 9) extending vertically from printed circuit 900 to coupling structures for clip 552 along sidewall 802, it should be appreciated that portion 816 of FIG. 8 and/or portion 906 of FIG. 9 can extend vertically within housing 106 without being coupled to, attached to, or in contact with sidewall 802. For example, FIG. 5 shows how these vertically extending portions of the feed circuitry for clip 552 (and accordingly for the display-integrated antenna) can extend vertically within housing 106, but away from or separate from the sidewalls of the housing. In these examples, clip 552 and/or the other structures shown in sidewall 802 can be mounted on the sidewall as shown or can be located away from the sidewall (e.g., floating within the housing or mounted to an intermediate support structure within the housing and away from the sidewall).

As described above in connection with, for example, FIGS. 3, 4, and 5, one or more grounding connectors such as connectors 172 and/or 174 may be provided between the antenna structure of display-integrated antenna 103 and a conductive portion of housing 106. Antenna feed assembly 813 may be disposed at a first end 918 of housing 106. The grounding connector may be coupled between the display-integrated antenna at an opposing second end 920 of housing 106.

Figure 10:
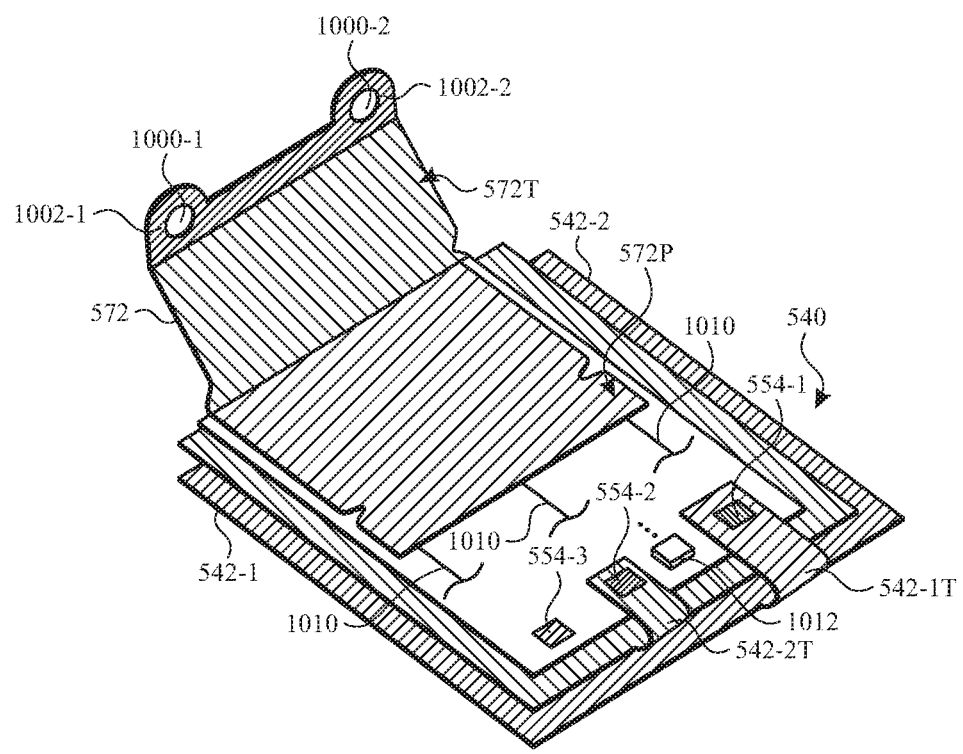
FIG. 10 illustrates a rear perspective view of display structures that may be used in forming a part of a display-integrated antenna and that are shorted to conductive device housing structures in accordance with various aspects of the subject technology.

A rear perspective view of illustrative electrical components that may be stacked under display cover layer 546 and that may form antenna conductor elements of antenna 103 is shown in FIG. 10. As shown in FIG. 10, display module 540 may include touch layer 542-1, display panel layer 542-2, and antenna layer 542-3. Touch layer 542-1, display panel layer 542-2, and communications layer 542-3 are stacked next to each other and may therefore be capacitively coupled to each other, if desired. This may, for example, allow layers 542 to operate together as conductive display structures of antenna 103 at radio frequencies (e.g., at WLAN, WPAN, satellite navigation, Bluetooth, and/or cellular telephone frequencies).

Touch layer 542-1, display panel layer 542-2, and communications layer 542-3 may be interconnected with other components in device 100 such as display module interface circuitry 558 (see., e.g., FIG. 5) using connectors 554 (e.g., a first connector 554-1 coupled to touch layer 542-1, a second connector 554-2 coupled to display panel layer 542-2, and a third connector 542-3 coupled to communications layer 542-3). Connectors 554 may be mounted on the underside of communications layer 542-3, on tail 542-2T of display panel layer 542-2, on tail 542-1T of touch layer 542-1, and/or on other suitable structures. Layers 542 need not have tails if desired.

Components 1012 may be mounted to touch layer 542-1, display panel layer 542-2, and/or communications 542-3. Components may, for example, include communications circuitry such as near-field communications circuitry, touch sensor processing circuitry, and/or display driver circuitry. Other types of components may be mounted in the stack of module 540 if desired. For example, a force sensor layer may be included in module 540. As another example, the functions of two or more of these layers may be consolidated. For example, capacitive touch sensor electrodes for a capacitive touch sensor may be formed from metal traces on organic light-emitting diode display layer 542-2 and a separate touch sensor layer 542-1 may be omitted.

As shown in FIG. 10, conductive interconnect structure 572 may be shorted to conductive structures such as conductive structures 1010 of display module 540. Conductive structures 1010 may include conductive traces on layers 542, conductive contact pads, conductive electrodes on layers 542, portions of a conductive frame or back plate for module 540, shielding structures in module 540, NFC antenna structures, pixel circuitry, ground lines in module 540, or any other desired conductive structures (e.g., structures coupled to feed terminal 304 and that include some or all of the conductive structures of display 110).

Conductive interconnect structure 572 may include a first region (portion) 572P that is coupled to conductive structures 1010 on module 540 and a second (tail) region 572T. Region 572P may be secured to communications layer 542-3 or other portions of module 540 using conductive adhesive, conductive screws, conductive springs (e.g., conductive springs that exert a force on region 572P towards communications layer 542-3), or any other desired conductive fastening structures. Conductive interconnect structure 572 may include conductive traces on a flexible printed circuit, stamped sheet metal, metal foil, a layer of conductive adhesive, a conductive layer having adhesive and non-adhesive portions, combinations of these, or any other desired conductive structures or layers.

When display 110 is assembled on housing 106, tail region 572T may extend across gap 513 (see, e.g., FIG. 5). Tail region 572T may include one or more brackets or tabs 1002 having corresponding holes 1000 (e.g., a first tab 1002-1 having a first hole 1000-1 and a second tab 1002-2 having a second hole 1000-2). Tabs 1002 may be secured to housing wall 106W. Tabs 1002 may be held in place by screws 570 (see, e.g., FIG. 5) or other conductive fasteners to maintain a reliable mechanical and electrical connection between tabs 1002 and housing wall 106W. In this way, an antenna element in display 110 may be shorted to housing wall 106W across gap 513 using interconnect structure 572. The example of FIG. 10 is merely illustrative. If desired, holes 1000 may be omitted. If desired, tail 572T may include a single continuous conductor extending across any desired length of housing wall 106W.

Figure 11:
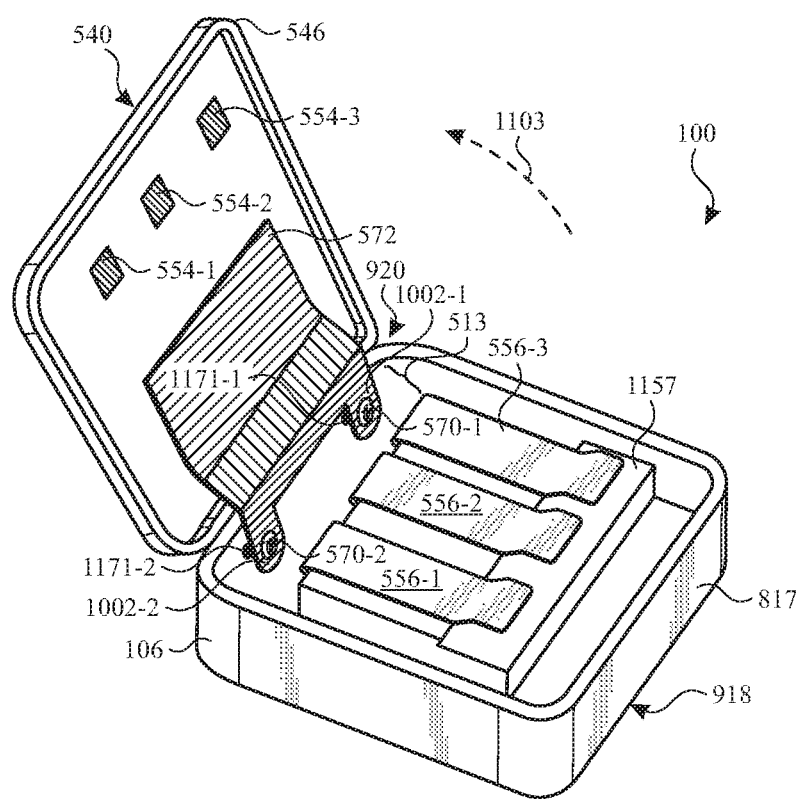
FIG. 11 illustrates a front perspective view of an electronic device having conductive display structures that are used in forming a part of an antenna and that are shorted to conductive device housing structures in accordance with various aspects of the subject technology.

FIG. 11 is a perspective front view of device 100 showing how conductive interconnect 572 may be coupled between housing wall 106W and display module 540. In the perspective view of FIG. 11, display cover layer 546 and display module 540 have been removed from device 100 (e.g., one end of display 110 has been rotated upwards off of housing sidewalls 106W as shown by arrow 1103) to expose the components within device 100. When device 100 is fully assembled, display 110 may be mounted onto sidewalls 106W so that the bottom of cover layer 146 lies flush with the top edges or ledge 800 (not shown in FIG. 11) of sidewalls 106W.

As shown in FIG. 11, multiple display flex circuits 556 may be formed over logic board 563 (e.g., a first flex 556-1, a second flex 556-2, and a third flex 556-3). If desired, flexes 556-1, 556-2, and 556-3 may be mounted on a support structure such as support structure 1157 on logic board 563. When display 110 is closed onto housing walls 106W, display flex 556-3 may be electrically coupled to connector 554-3 on display module 540, display flex 556-2 may be electrically coupled to connector 554-2 on display module 540, and display flex 556-1 may be electrically coupled to connector 554-1 on display module 540. Display flex 556-3 and connector 554-3 may, for example, convey communications signals between communications layer 542-3 on module 540 and other communications circuitry (e.g., transceiver circuitry 590) on logic board 563. Display flex 556-2 and connector 554-2 may, for example, convey image data between display panel layer 542-2 on module 5540 and display circuitry on logic board 563. Display flex 556-1 and connector 554-1 may, for example, convey touch sensor data between touch layer 542-1 on module 540 and control circuitry on logic board 563.

Tab 1002-1 of conductive interconnect structure 572 may be secured to housing wall 106W using conductive screw 570-1 and/or other conductive fastening structures. If desired, screw 570-1 may be received by a mating threaded hole 1171-1 in housing wall 106W. Tab 1002-2 of conductive interconnect structure 572 may be secured to housing wall 106W using conductive screw 570-2 and/or other conductive fastening structures. If desired, screw 570-1 may be received by a mating threaded hole 1171-2 in housing wall 106W. Conductive interconnect 572 may short conductive structures in display module 540 to housing sidewall 106W over tabs 1002 and screws 570. When display 110 is closed over sidewalls 106W, conductive interconnect 572 may bridge gap 513.

Figure 12:
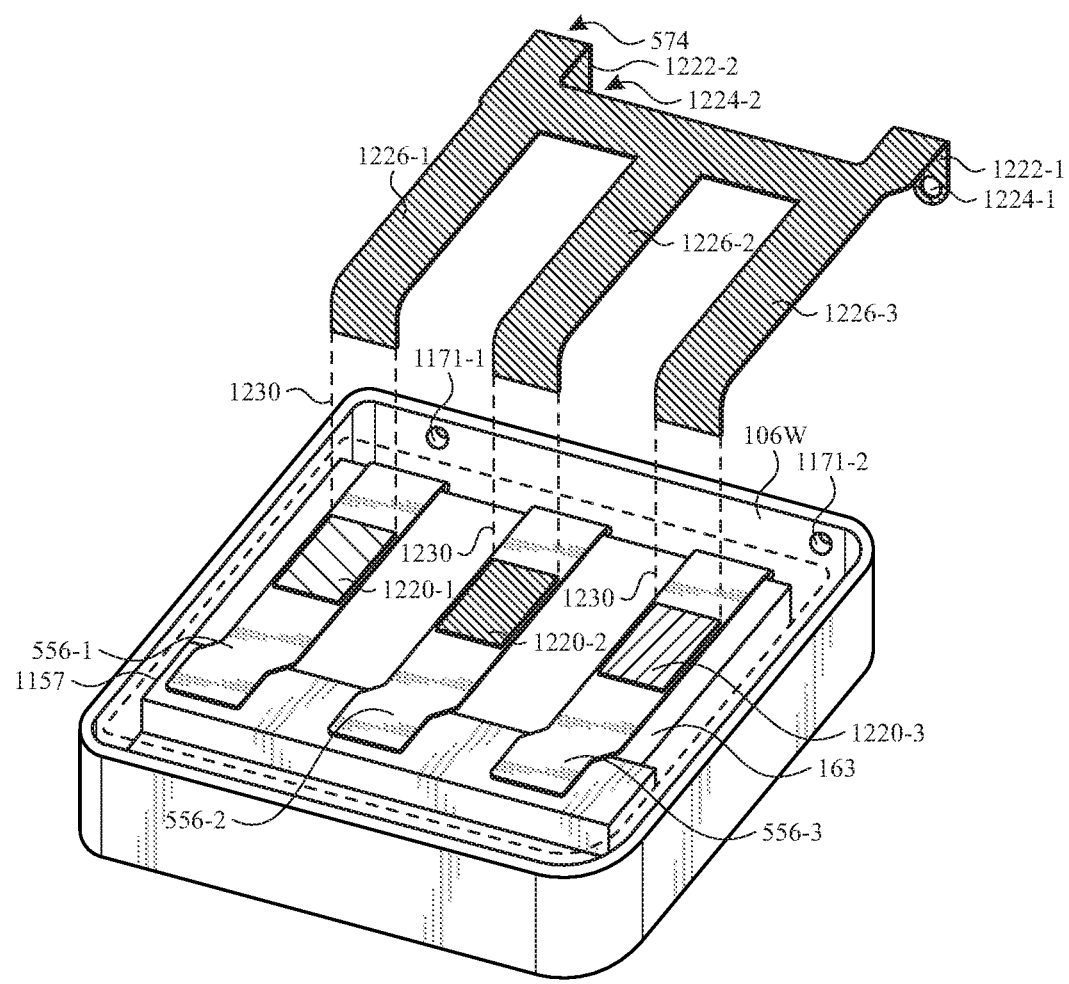
FIG. 12 illustrates a perspective view of an electronic device having conductive interconnect structures that short display printed circuits to conductive device housing structures in accordance with various aspects of the subject technology.

FIG. 12 is a perspective front view of device 100 showing how conductive interconnect 574 (see, e.g., FIG. 5) may be coupled between housing wall 106W and display flexes 556. Conductive interconnect 574 may be formed within device 100 in addition to or instead of conductive interconnect 572 of FIGS. 10 and 11. In the perspective view of FIG. 12, display cover layer 546 and display module 540 (i.e., display 110) are not shown for the sake of clarity.

As shown in FIG. 12, display flex circuits 556 may have conductive regions 1220. Conductive regions 1220 may, for example, include ground traces or other grounded portions of flex circuits 556. For example, flex circuit 556-1 may have a first conductive region 1220-1, flex circuit 556-2 may have a second conductive region 1220-2, and flex circuit 556-3 may have a third conductive region 1220-3. Conductive interconnect structure 574 may include tabs or brackets 1222 each having a corresponding hole 1224 (e.g., a first tab 1222-1 having a first hole 1224-1 and a second tab 1222-2 having a second hole 1224-2).

Conductive interconnect structure 574 may include one or more branches 1226. For example, conductive interconnect structure 574 may include a first branch 1226-1, a second branch 1226-2, and a third branch 1226-3. While the use of different branches may reduce the amount of space required to form interconnect structure 574 in device 100, in another suitable arrangement, each of the branches may be formed as a part of a single continuous (e.g., planar) conductor.

When device 100 is fully assembled, conductive interconnect structure 574 may be lowered towards logic board 563 as shown by arrows 1230. This may place branch 1226-1 into contact with conductive region 1220-1, may place branch 1226-2 into contact with conductive region 1220-2, and may place branch 1226-3 into contact with conductive region 1220-3 on flex circuits 556. If desired, conductive adhesive, conductive screws, solder, welds, clips, or other conductive fastening structures may be used to secure branches 1226 to corresponding conductive regions 1220 when interconnect structure 574 is lowered onto device 100. Tab 1224-1 may be secured to housing wall 106W via a first screw 570 extending through opening 1224-1 and mating with threaded hole 1171-2 in housing wall 106W. Tab 1224-2 may be secured to housing wall 106W via a second screw 570 extending through opening 1224-2 and mating with threaded hole 1171-1 in housing wall 106W. This is merely illustrative and, if desired, other conductive fasteners may be used. One or more than two tabs 1224 may be used to secure interconnect structure 574 to housing wall 106W.

In this way, when fully assembled, conductive interconnect structure 570 may short grounded regions 1220 on display flexes 556 to housing wall 106W. This may serve to electrically define at least some of the boundaries of a slot antenna element in a slot antenna implementation for antenna 103. If desired, branches 1226 may be capacitively coupled to conductive structures in display module 540. In this scenario, branches 1226 may short antenna currents flowing through display module 540 to housing sidewall 106W via capacitive coupling. Branches 1226 need not be coupled to regions 1220 on flexes 556 in this scenario if desired.

Figure 13:
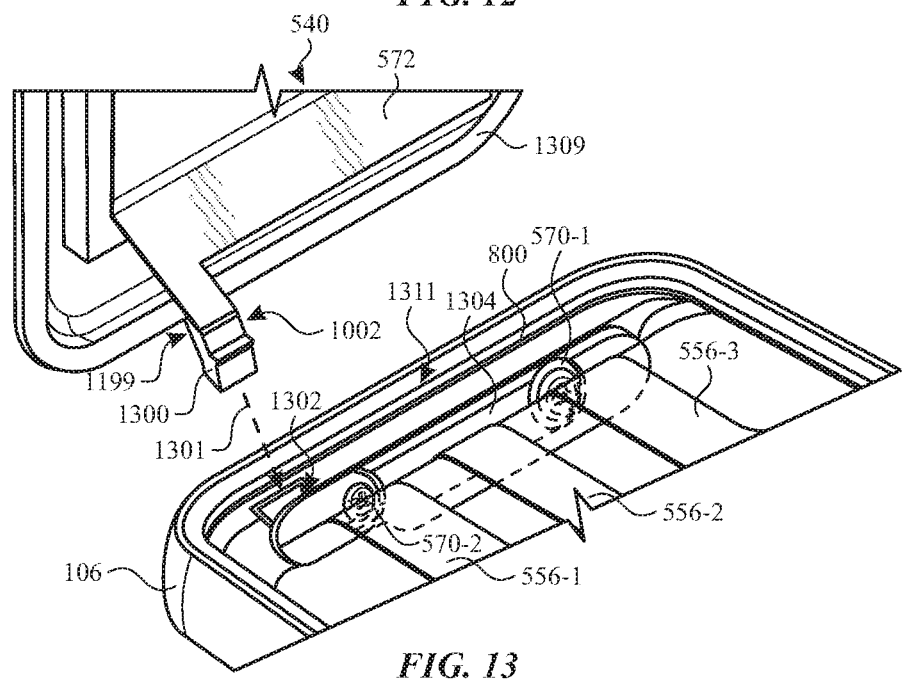
FIG. 13 illustrates a front perspective view of an electronic device having conductive display structures that are used in forming a part of an antenna and that are shorted to conductive device housing structures by a connector in a housing slot in accordance with various aspects of the subject technology.

FIG. 13 shows an implementation of interconnect 572, as described above in connection with FIG. 11, in which tabs 1002-1 and 1002-2 are replaced with a single tab 1199 having a connection interface such as connector 1300. In the example of FIG. 13, housing 106 includes a slot 1302 for receiving connector 1300 to conductively couple interconnect 572 (e.g., a conductive grounding tape) to housing 106. Slot 1302 may be a recess in a fourth sidewall of housing 106 that is sized and configured to receive connector 1300. Connector 1300 may be press fit into slot 1302 by moving connector 1300 in the direction of arrow 1301 and may be secured in slot 1302 by bracket 1304.

Figure 14:
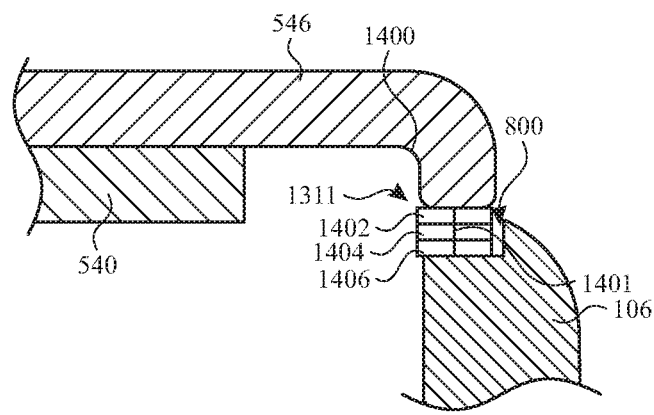
FIG. 14 illustrates a cross-sectional side view of a portion of an electronic device having display-integrated antenna structures coupled to a ledge of a housing of the electronic device in accordance with various aspects of the subject technology.

FIG. 13 also shows how ledge 800 may be partially covered by a touch sensor such as a force-sensing layer 1311 that is configured to be disposed between ledge 800 and an interfacing surface 1309 of display cover 546. In some scenarios, conductive paths 308 and/or 312 may be implemented without connectors 572 or 574. For example, FIG. 14 shows an implementation in which antenna element structures within display module 540 are coupled to housing 106 by a conductive structure 1400 that extends along an interior surface of display cover layer 546 and a conductive structure 1401 that passes through force sensor 1311 disposed on ledge 800 between ledge 800 and an interfacing surface of display cover layer 546. As shown, force sensor 1311 (e.g., a piezoelectric, resistive, capacitive, or other force sensor) may include multiple layers such as layers 1402, 1404, and 1406 through which conductive structure 1401 (e.g., a conductive via passing through layers 1402, 1404, and 1406) passes.

Figure 15:
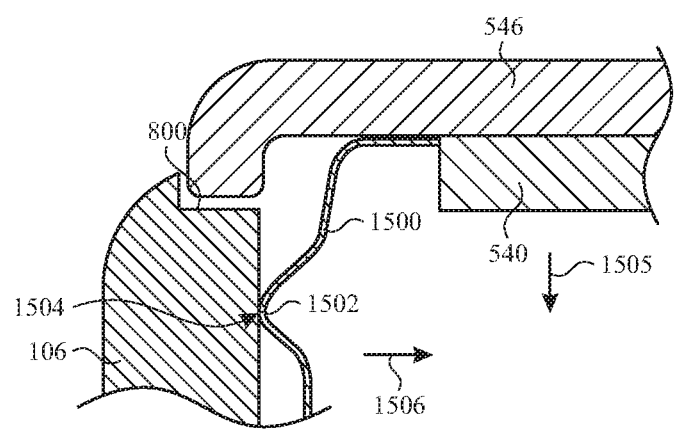
FIG. 15 illustrates a cross-sectional side view of a portion of an electronic device having display-integrated antenna structures coupled to a sidewall of a housing of the electronic device by a conductive press-fit clip in accordance with various aspects of the subject technology.

FIG. 15 shows another example implementation of conductive paths 308 and/or 312. In the example of FIG. 15, antenna element structures within display module 540 are coupled to housing 106 by a conductive press-fit contact structure 1500 such as a spring clip. As shown in FIG. 15, conductive press-fit contact 1500 may extend from display module 540, along an interior surface of display cover layer 546, to a press-fit contact location 1504 on housing 106. For example, conductive press-fit contact 1500 may be a flexible conductive structure having a protrusion 1502 that is compressed against the interior surface of housing 106 when display 110 is pressed into housing 106 (e.g., in direction 1505) and protrusion 1502 is then pressed in direction 1506 by housing 106 to create a press-fit contact between protrusion 1502 and housing 106.

In accordance with various aspects of the subject disclosure, an electronic device is provided that includes a housing having a sidewall with a recess. The electronic device also includes an antenna. The electronic device also includes a display that forms at least part of an antenna element for the antenna. The electronic device also includes an antenna feed for the antenna, the antenna feed located within the recess in the sidewall and configured to convey communications signals for three different communications protocols to the antenna element.

In accordance with other aspects of the subject disclosure, an electronic device is provided that includes a housing having a sidewall with a recess. The electronic device also includes an antenna. The electronic device also includes a display that forms at least part of an antenna element for the antenna. The electronic device also includes an antenna feed for the antenna, the antenna feed located within the recess in the sidewall. The electronic device also includes a first flexible printed circuit communicatively coupled to the antenna feed and extending along the sidewall. The electronic device also includes a second flexible printed circuit having a first end communicatively coupled to the first flexible printed circuit, an opposing second end that is communicatively coupled to a printed circuit board disposed in the housing, and a mid-portion that extends along the sidewall between the first end and the opposing second end.

In accordance with other aspects of the subject disclosure, an electronic device is provided that includes a housing having a sidewall with a recess. The electronic device also includes an antenna. The electronic device also includes a display that forms at least part of an antenna element for the antenna. The electronic device also includes an antenna feed for the antenna, the antenna feed located within the recess in the sidewall. The electronic device also includes a connector that electrically couples the antenna to a conductive portion of the housing.

In accordance with other aspects of the subject disclosure, an electronic device is provided that includes a housing having a rear surface and one or more sidewalls. The electronic device also includes an antenna. The electronic device also includes display that forms at least part of an antenna element for the antenna. The one or more sidewalls extend vertically from the rear surface of the housing to the display. The electronic device also includes an antenna feed for the antenna. The electronic device also includes a flexible printed circuit having a first end communicatively coupled to the antenna feed, an opposing second end that is communicatively coupled to a printed circuit board disposed in the housing, and a mid-portion between the first end and the opposing second end that extends vertically within the housing in a direction that is parallel to the vertically extending one or more sidewalls.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device, comprising:
    a housing having a sidewall with a recess;
    an antenna;
    a display including an integrated antenna layer that forms at least part of an antenna element for the antenna; and
    an antenna feed for the antenna, the antenna feed being coupled to a first end of the display and located within the recess in the sidewall, wherein the antenna feed is configured to convey communications signals for three different communications protocols to the antenna element, and wherein an opposing second end of the display is electrically coupled to the housing.

2. The electronic device of claim 1, wherein the three different communications protocols comprise a global positioning system protocol, a WiFi® protocol, and a Bluetooth® protocol.

3. The electronic device of claim 1, wherein the housing is monolithic conductive housing and wherein the antenna element is an antenna emitting and receiving element that both emits and receives electromagnetic signals.

4. The electronic device of claim 1, further comprising a flexible printed circuit communicatively coupled to the antenna feed and extending along the sidewall.

5. The electronic device of claim 4, further comprising radio-frequency transceiver circuitry coupled to the antenna via the flexible printed circuit and the antenna feed, the transceiver circuitry configured to transmit and receive antenna signals at frequencies above 960 MHz using the antenna.

6. The electronic device of claim 4, further comprising a connector formed on the flexible printed circuit.

7. The electronic device of claim 6, wherein the flexible printed circuit is a first flexible printed circuit and the connector formed on the flexible printed circuit is a first connector, the device further comprising a second flexible printed circuit having a second connector coupled to the first connector.

8. The electronic device of claim 7, wherein the housing further comprises a ledge that runs along the sidewall, wherein the display includes a display cover layer having an edge that mates with the ledge, wherein the ledge is disposed at a front of the housing, wherein the device further comprises a printed circuit board at a rear of the housing, and wherein the second flexible printed circuit extends from the first connector along the sidewall to the printed circuit board.

9. The electronic device of claim 8, wherein the sidewall of the housing is a first sidewall having first and second ends, wherein the recess is located nearer a first end of the first sidewall than a second end of the first sidewall, and wherein the housing further comprises:
 a second sidewall that extends perpendicularly from the first end of the first sidewall, and
 a third sidewall that extends perpendicularly from the second end of the first sidewall, and
 wherein the second sidewall, the third sidewall, and a portion of the first sidewall that extends from the recess to the third sidewall are free of antenna elements.

10. The electronic device of claim 1, further comprising:
 a printed circuit board; and
 a display flexible printed circuit coupled between the printed circuit board and the display,
 wherein the housing is a conductive housing that is conductively coupled to an exposed contact on the display flexible printed circuit.

11. An electronic device, comprising:
 a housing having a sidewall with a recess;
 an antenna;
 a display including an integrated antenna layer that forms at least part of an antenna element for the antenna;
 an antenna feed for the antenna, the antenna feed being located within the recess in the sidewall and coupled to a first end of the display, wherein an opposing second end of the display is electrically coupled to the housing;
 a first flexible printed circuit communicatively coupled to the antenna feed and extending along the sidewall; and
 a second flexible printed circuit having a first end communicatively coupled to the first flexible printed circuit, an opposing second end that is communicatively coupled to a printed circuit board disposed in the housing, and a mid-portion that extends along the sidewall between the first end and the opposing second end.

12. The electronic device of claim 11, wherein the sidewall includes:
 a vertical portion that extends perpendicularly from a rear portion of the housing toward a front of the housing; and
 an angled portion that extends non-perpendicularly away from the rear portion of the housing and toward an outer sidewall surface of the sidewall.

13. The electronic device of claim 12, wherein the first flexible printed circuit is disposed on the angled portion of the sidewall and wherein the mid-portion of the second flexible printed circuit includes an s-curve portion disposed on the vertical portion of the sidewall.

14. The electronic device of claim 13, wherein the s-curve portion of the second flexible printed circuit extends along the vertical portion of the sidewall in a direction that is parallel to a boundary between the vertical portion and the angled portion.

15. The electronic device of claim 11, wherein the opposing second end of the second flexible printed circuit is soldered to the printed circuit board.

16. The electronic device of claim 11, wherein the first flexible printed circuit is detachably connected to the first end of the second flexible printed circuit.

17. An electronic device, comprising:
 a housing having a rear surface and one or more sidewalls;
 an antenna;
 a display including an integrated antenna layer that forms at least part of an antenna element for the antenna, wherein the one or more sidewalls extend vertically from the rear surface of the housing to the display;
 an antenna feed for the antenna, the antenna feed being located within the recess in the sidewall and coupled to a first end of the display, and
 a connector that electrically couples the antenna to a conductive portion of the housing, wherein the connector is coupled to an opposing second end of the display.

18. The electronic device of claim 17, wherein the housing comprises a peripheral ledge, wherein the display comprises a display cover layer having a surface that interfaces with the peripheral ledge, and wherein the connector extends from the peripheral ledge to the interfacing surface of the display cover layer.

19. The electronic device of claim 18, further comprising a touch sensor disposed between the peripheral ledge and the interfacing surface of the display cover layer, wherein the connector extends through the touch sensor.

20. The electronic device of claim 17, wherein the connector comprises a spring clip attached to the display and forming a conductive press-fit contact with the conductive portion of the housing.

21. The electronic device of claim 17, wherein the connector comprises a flexible conductive tape that extends from the opposing second end of the display to the conductive portion of the housing.

22. The electronic device of claim 21, further comprising a connection interface coupled to the flexible conductive tape, wherein the connection interface is configured to fit in a slot in the conductive portion of the housing.

23. The electronic device of claim 17, wherein the connector conductively or capacitively couples the antenna to a conductive portion of the housing.

24. The electronic device of claim 17, further comprising:
 a printed circuit board; and
 a display flexible printed circuit coupled between the printed circuit board and the display,
 wherein the connector comprises a conductive tape coupled between the conductive portion of the housing and an exposed contact on the display flexible printed circuit.

* * * * *